United States Patent
Knee

(10) Patent No.: US 9,311,714 B2
(45) Date of Patent: *Apr. 12, 2016

(54) IMAGE PROCESS WITH SPATIAL PERIODICITY MEASURE

(71) Applicant: Snell Limited, Lower Earley, Reading (GB)

(72) Inventor: Michael James Knee, Petersfield (GB)

(73) Assignee: Snell Limited, Berkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/736,440

(22) Filed: Jun. 11, 2015

(65) Prior Publication Data

US 2015/0279041 A1 Oct. 1, 2015

Related U.S. Application Data

(63) Continuation of application No. 14/036,054, filed on Sep. 25, 2013, now Pat. No. 9,082,044.

(30) Foreign Application Priority Data

Sep. 25, 2012 (GB) .................................. 1217114.6

(51) Int. Cl.
| | |
|---|---|
| *G06K 9/36* | (2006.01) |
| *G06T 7/00* | (2006.01) |
| *G06K 9/62* | (2006.01) |
| *H04N 19/00* | (2014.01) |
| *H04N 19/85* | (2014.01) |
| *H04N 19/513* | (2014.01) |
| *G06T 5/40* | (2006.01) |
| *G06T 7/40* | (2006.01) |

(52) U.S. Cl.
CPC ............ *G06T 7/0048* (2013.01); *G06K 9/6212* (2013.01); *G06T 5/40* (2013.01); *G06T 7/0042* (2013.01); *G06T 7/0081* (2013.01); *G06T 7/402* (2013.01); *G06T 7/403* (2013.01); *H04N 19/00* (2013.01); *H04N 19/521* (2014.11); *H04N 19/85* (2014.11); *G06T 2207/10004* (2013.01)

(58) Field of Classification Search
CPC ....... H06K 9/6212; H04N 19/00; G06K 9/00; G06K 9/2054; G06K 2209/01; G06K 9/00469; G06K 9/222
See application file for complete search history.

(56) References Cited

U.S. PATENT DOCUMENTS

| | | |
|---|---|---|
| 5,189,513 A | 2/1993 | Sekine et al. |
| 8,600,178 B1 | 12/2013 | Woodall et al. |

(Continued)

OTHER PUBLICATIONS

Search Report from priority application No. GB1217114.6. Date of search Mar. 18, 2013.

*Primary Examiner* — Phuoc Tran
(74) *Attorney, Agent, or Firm* — Woodard, Emhardt, Moriarty, McNett & Henry LLP

(57) ABSTRACT

An image manipulation process is controlled by a spatial periodicity measure formed for an image or an image block by measuring the sparseness of the two-dimensional spatial frequency spectrum of the image on a scale of zero to unity in which a two-dimensional spatial frequency spectrum having all equal values has a sparseness of zero and in which a two-dimensional spatial frequency spectrum having only one non-zero value has a sparseness of unity. Sparseness may be measured by allocating values of the spectrum to frequency bins and counting the number of bins that contain non-zero values; comparing values of the spectrum with a threshold and counting the number of values that exceed the threshold; or forming a function of the mean-square value and the mean value of the spectrum values.

20 Claims, 4 Drawing Sheets

(56) References Cited

U.S. PATENT DOCUMENTS

| | | | | |
|---|---|---|---|---|
| 9,082,044 B2 * | 7/2015 | Knee | ................... | G06K 9/6212 |
| 2004/0247028 A1 | 12/2004 | Kim | | |
| 2006/0083407 A1 | 4/2006 | Zimmermann et al. | | |
| 2008/0317129 A1 | 12/2008 | Lertrattanapanich | | |
| 2010/0008423 A1 | 1/2010 | Namboodiri et al. | | |

* cited by examiner

IMAGE PROCESS WITH SPATIAL PERIODICITY MEASURE

CROSS-REFERENCE TO RELATED APPLICATION

This application is a continuation application of U.S. patent application Ser. No. 14/036,054, filed Sep. 25, 2013 which claims the benefit of Great Britain Application No. GB 1217114.6, filed Sep. 25, 2012, the entire disclosure of which is hereby incorporated by reference.

FIELD OF INVENTION

This invention concerns image processing and, in particular, the detection of periodic structures.

BACKGROUND OF THE INVENTION

Spatially periodic structures, that is to say image features that repeat over at least part of the image area can cause problems for some image processing tasks. (In the remainder of this specification periodicity means spatial periodicity unless another meaning is specifically stated.) Railings, empty seats in an Olympic stadium, and windows of skyscrapers are typical periodic structures. An example of an image processing task for which periodic structures are problematic is motion compensated frame rate interpolation, and the difficulties of a particular case will now be explained with reference to FIGS. 1 to 3.

FIG. 1 shows one-dimensional sections through two successive frames (101), (102) in a time sequence of sampled images, referred to as the previous frame (101) and next frame (102). A set of adjacent pixels along a particular direction within a particular image region is represented by small circles in the Figure. The luminance values of the pixels are represented by the fill pattern of the circles, and, for simplicity it is assumed that only three luminance values exist—represented by white fill, hatched fill, and black fill.

The spatial sequence of pixel values comprises a periodic structure with a period of six pixel pitches (103). This structure moves, over a distance of two pixel pitches, to a new position in the next frame (102). This is indicated by the motion vector (105) which is shown pointing from a pixel (106) in the previous frame to a matching pixel (107) in the next frame. An incorrect motion vector (108) is also shown, with a motion of four times the pixel pitch in the opposite direction. Though incorrect with regard to the actual motion of the structure, this second motion vector (108) represents an equally valid interpretation of the local information in the two images, demonstrated by the exact matching of the values of pixels (106) and (109).

For some applications of motion estimation, incorrect motion vectors arising from periodic structures do not pose a significant problem. For example, in compression involving motion compensated interframe prediction, the prediction resulting from such an incorrect vector may be as good as that resulting from the correct vector. The only disadvantage in using the incorrect vector is that the motion vectors may be less consistent, so the cost of transmitting motion vectors may increase slightly.

For other applications, such as motion compensated frame rate interpolation, incorrect motion vectors arising from periodic structures may significantly degrade the performance of the interpolation. In FIG. 2, interpolation of an intermediate image (203) using correct motion vectors is shown. In this exemplary motion-compensated process, the interpolated output frame (203) is derived from the combination of: a frame (205) that is a shifted version of the previous frame (201); and, a frame (207) that is a shifted version of the next frame (202). For clarity the two contributing frames are shown in the Figure adjacent to the position of the output frame (203), however their true positions coincide with position of the output frame (203).

Pixels are projected from the previous image (201) according to a correct forward vector (204) to form the forward projected image (205), and pixels are projected from the next image (202) according to a correct backward vector (206) (which is equal in size and opposite in direction to the forward vector) to form the backward projected image (207). The average of the two (in this case identical) projected images is used to produce the interpolated output image (203).

We now consider an example, illustrated in FIG. 3, where one of the motion vectors, in this case the backward vector (306), is incorrect because of the ambiguity arising from the periodic structure. The backward projected frame (307) now has a spatial phase difference of 180° (three pixel pitches) with respect to the forwards projection, with the result that the two contributions (305), (307) to the interpolated result (303) are misaligned and make an incorrect interpolated image (303). The resulting interpolated moving sequence would have significant flicker and motion judder.

Several methods for detecting and for correcting for periodic structures in images have been proposed. In U.S. Patent 2010/008423, Namboodiri et al disclose a method for periodic structure detection in which significant peaks are sought in the two-dimensional frequency-domain representation of blocks in a picture. In "Detecting Periodic Structures", Orwell et al [Orwell, J. M. and Boyce, J. F. 'Detecting Periodic Structures', Proc. Fourteenth International Conference on Pattern Recognition, 1998, pp. 714-716] disclose a method for periodic structure detection based on feature detection followed by an autocorrelation process on the detected features. In "Periodicity, directionality and randomness: Wold features for image modeling and retrieval" Liu and Picard [Liu, F. and Picard, R. W. 'Periodicity, directionality and randomness: Wold features for image modeling and retrieval', IEEE Trans. on PAMI, vol. 18, no. 7, July 1996, pp. 722-733] disclose a method for periodic structure detection based on image autocovariance functions. In U.S. Pat. No. 5,793,430, Knee et al disclose a method based on analysing a line of block-based displaced frame differences in a block matching motion estimator.

The prior-art methods are either very complex to implement, fail to detect periodic structures with multiple dominant frequency components, or give "false alarms" on non-periodic structures such as straight edges. The present invention addresses some or all of these deficiencies of the prior art.

SUMMARY OF THE INVENTION

The inventor has observed that an important indicator of the presence of periodic structures in an image is the sparsity of the representation of the image in the two-dimensional frequency domain, and has developed a method and apparatus for periodic structure detection that exploits that observation.

The invention consists in an image manipulation process that depends on a spatial periodicity measure for image data that is a function of the sparseness of the two-dimensional spatial frequency spectrum of the processed image data.

In a preferred embodiment, at least one two-dimensional block of image data is processed in a two-dimensional Fourier transform, and a periodicity measure for the block(s) is evaluated from the portion of the transformed image data that represents AC components of the spectrum.

Preferably the said sparseness is a function of the mean-square value of the transformed image data for the said two-dimensional block and the mean value of the transformed image data for that two-dimensional block.

Advantageously the sparseness is a linear function of the mean-square value of the transformed image data and the square of the mean value of the transformed image data.

The sparseness may further depend on the mean-square value of one or more transform output values corresponding to low spatial frequencies.

BRIEF DESCRIPTION OF THE DRAWINGS

Examples of the invention will now be described with reference to the drawings in which.

DETAILED DESCRIPTION OF THE INVENTION

In an exemplary image manipulation process according to the invention, an image to be processed using motion compensation is divided into a number of regions, or 'blocks', and a periodicity measure is derived for each block. These periodicity values are used to control the operation of the motion compensation process, so that more weight is given to the zero motion vector when processing blocks having high periodicity measures. Thus these blocks are less likely to be shifted by, potentially unreliable, non-zero vectors.

Figure 1:
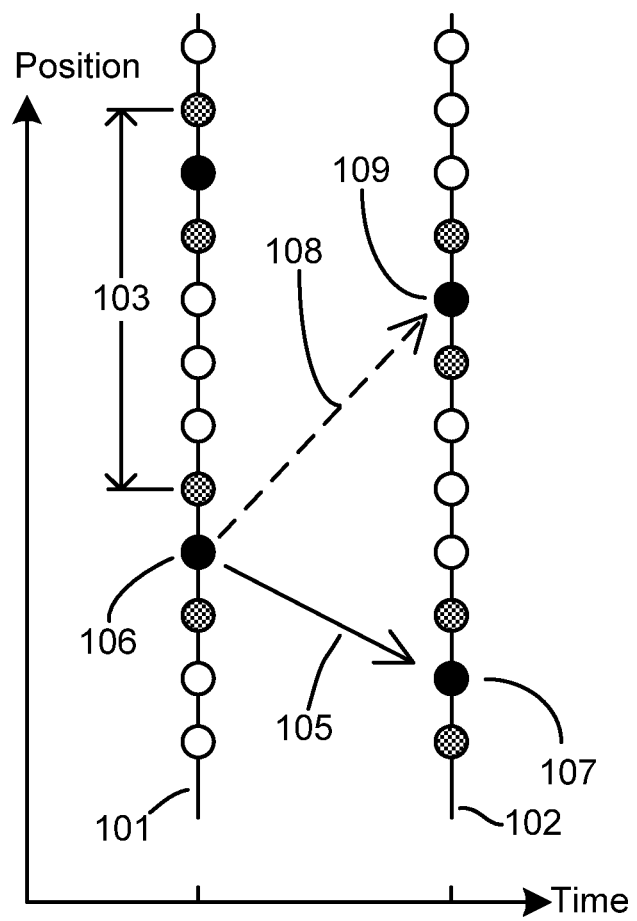
FIG. 1 is a diagram showing a correct and an incorrect motion vector measured between two frames of an image sequence containing a periodic structure.
Figure 2:
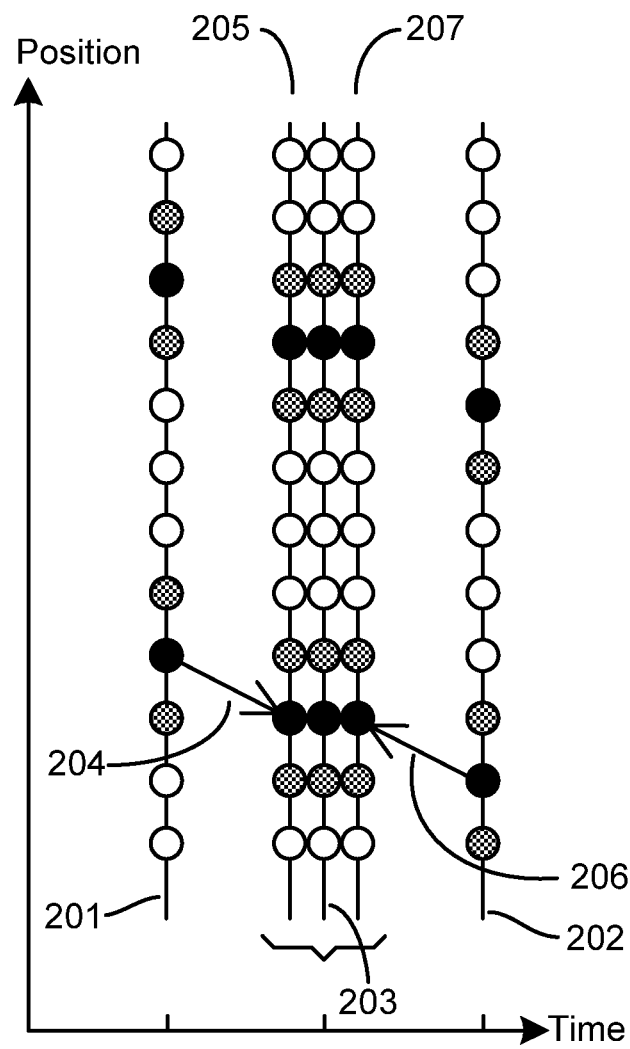
FIG. 2 is a diagram showing motion compensated temporal interpolation using correct motion vectors between two frames of a sequence containing a periodic structure according to the prior art.
Figure 3:
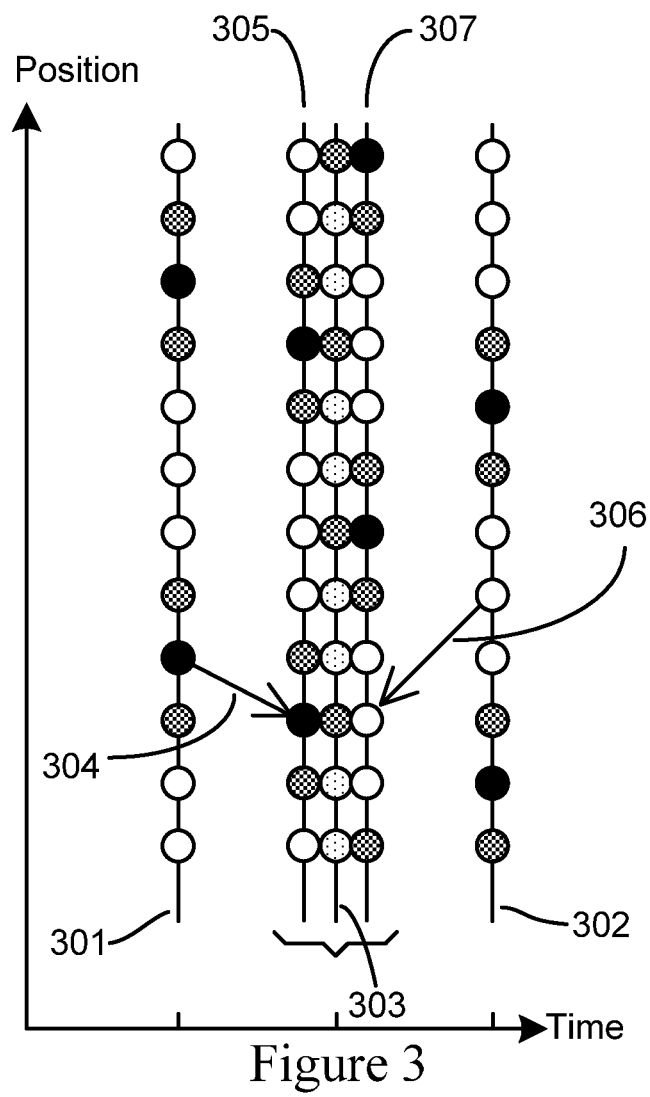
FIG. 3 is a diagram showing motion compensated temporal interpolation using incorrect motion vectors between two frames of a sequence containing a periodic structure according to the prior art.
Figure 4:
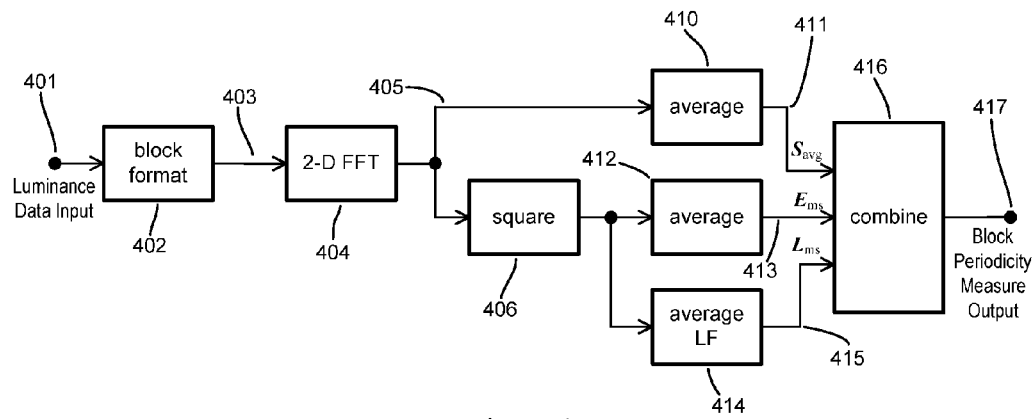
FIG. 4 is a block diagram of a preferred embodiment of a periodic structure detection system according to the invention.

A suitable method of deriving periodicity values for the blocks of an image will now be described with reference to FIG. 4. Incoming luminance data (401) that corresponds to the pixels of an image is passed to a block formatter (402) where it is formatted into rectangular blocks of pixels (403). Typical block dimensions are 32×32 pixels, and the blocks may overlap. Each block of pixel values is processed as described below to obtain a periodicity measure (417) for the block.

The block data is passed to a two-dimensional frequency transform such as an FFT (404) to produce a transformed set of data values (405) that are a function of the magnitudes of the spatial frequency components that comprise the spatial frequency spectrum of the block. For a 32×32 pixel block, there will be 1,024 values which can conveniently be denoted $F_{i,j}$ and arranged so that:

$F_{0,0}$ is the magnitude of the DC component;
$F_{15,0}$ is the magnitude of the highest positive horizontal frequency component;
$F_{-16,0}$ is the magnitude of the highest negative horizontal frequency component;
$F_{0,15}$ is the magnitude of the highest positive vertical frequency component;
$F_{0,-16}$ is the magnitude of the highest negative vertical frequency component; etc.

The values $F_{i,j}$ are subjected to three processes whose outputs are combined in a combination block (416) that outputs a periodicity measure (417) for each block. The magnitude of the DC component $F_{0,0}$ is not used in these subsequent processes, which thus operate on the AC spectrum of the block.

In a first process the magnitudes of the non-DC components are squared (406) and averaged (412) to produce a mean-square sum (413) of the spectrum of the block. This represents mean-square spectral energy for the block and will be denoted as $E_{ms}$ so that:

$$E_{ms} = (\Sigma F_{i,j}^2) \div N \quad [1]$$

where the summation includes all spectral components $F_{i,j}$ excluding $F_{0,0}$; and,
N is the total number of spectral components (1,024 for a 32×32 pixel block).

In a second process the magnitudes of the non-DC components are averaged (410) to produce an average spectral volume (411) for the block. This will be denoted $S_{avg}$ so that:

$$S_{avg} = (\Sigma F_{i,j}) \div N \quad [2]$$

where the summation includes all spectral components $F_{i,j}$ excluding $F_{0,0}$; and,
N is the total number of spectral components (1,024 for a 32×32 pixel block).

In a third process the squares of the lowest-frequency spectral components, including horizontal, vertical and diagonal components, are averaged (414) to produce a mean-square sum of the low-frequency spectrum (415) of the block. This will be designated $L_{ms}$ so that:

$$L_{ms} = (F_{-1,-1}^2 + F_{0,-1}^2 + F_{1,-1}^2 + F_{-1,0}^2 + F_{1,0}^2 + F_{-1,1}^2 + F_{0,1}^2 + F_{1,1}^2) \div N \quad [3]$$

where: $F_{-1,-1}$ is the magnitude of the lowest negative backward-diagonal frequency component;
$F_{0,-1}$ is the magnitude of the lowest negative vertical frequency component;
$F_{1,-1}$ is the magnitude of the lowest negative forward-diagonal frequency component;
$F_{-1,0}$ is the magnitude of the lowest negative horizontal frequency component;
$F_{1,0}$ is the magnitude of the lowest positive horizontal frequency component;
$F_{-1,1}$ is the magnitude of the lowest positive forward-diagonal frequency component;
$F_{0,1}$ is the magnitude of the lowest positive vertical frequency component;
$F_{1,1}$ is the magnitude of the lowest positive backward-diagonal frequency component; and,
N is the total number of spectral components (1,024 for a 32×32 pixel block).

Finally, the mean-square spectral energy $E_{ms}$ (413), the average spectral volume $S_{avg}$ (411), and the low-frequency mean-square spectral energy $L_{ms}$ (415) are combined in a mathematical function (416) to produce a periodicity measure (417) for the block.

The principle by which the invention works is that blocks with a significant amount of periodic content, will have spatial frequency spectra that are "sparse". If the spectrum of the block is divided evenly into frequency regions, for example the frequency "bins" of a Fourier transform, the majority of the energy will be concentrated in a minority of the total number of regions. Sparseness may also be regarded as the extent to which the distribution of values departs from the uniform distribution having equal values. Thus, on a normalised scale, a distribution which had only one non-zero value might have a sparseness measure of unity whilst a uniform distribution might have a sparseness value of zero. For further discussion of the concept of "sparseness", reference is directed to a paper by Patrik O. Hoyer entitled "Non-negative matrix factorization with sparseness constraints" in Journal of Machine Learning Research 5 (2004) pp 1457-1469.

One general approach is to compare mean-square value of the transformed image data with the square of the mean value of the transformed image data. For example, a periodicity measure might be taken as the difference between (or other linear function of) the mean-square value of the transformed image data and the square of the mean value of the transformed image data. For example a periodicity measure $\psi$ may be given by:

$$\psi = E_{ms} - S_{avg}^2 \quad [4]$$

The square of the average spectral volume of a sparse spectrum will be relatively low, as compared to the mean-square energy, thus leading to a high periodicity measure. As an example, consider two 32×32 blocks, the first having $F_{i,j}$ values of unity throughout the block, and the second having a more sparse spectrum with 256 $F_{i,j}$ values of 2, and values of 0 for the remainder. The average spectral volume for the first block will be unity, and its square will also be 1. The second block has an average spectral volume of ½, so the square will be ¼. In both cases the mean-square energy will be unity.

If a significant proportion of the block energy is at very low frequencies, there is a high probability that the block contains a high-contrast edge or a large luminance ramp. As these are not periodic structures, the periodicity measure may be reduced when low-frequency spectral components are detected. For example:

$$\psi = \gamma E_{ms} - \alpha S_{avg}^2 - \beta L_{ms} \quad [5]$$

If 8-bit representation is used for the original luminance samples, then suitable values for the parameters are $\gamma=1$, $\alpha=2$, $\beta=3$, $\delta=96$.

A more particular example of the function (416) will now be given. The periodicity measure $\psi$ is given by:

$$\psi = \min\left\{1, \max\left\{0, \frac{\gamma E_{ms} - \alpha S_{avg}^2 - \beta L_{ms}}{\max(\delta, E_{ms})}\right\}\right\} \quad [6]$$

The maximum and minimum functions, and the division by $E_{ms}$, in equation [6] above provide "soft" normalization of the value of the periodicity measure, limiting its value to the range from zero to unity. Other techniques for providing normalisation of the approaches of equation [4] or equation [5] will occur to the skilled reader.

In another approach, a measure of sparseness is provided by counting the number of frequency bins that contain non-zero values or values above a defined threshold. That defined threshold might be a defined proportion (for example one quarter, one third or one half) of the mean value over the block. The mean of spatial frequency values may be replaced by other representative values such as the median or mode. In this approach, the smaller the number of values above the threshold, the greater is the sparseness.

The resulting periodicity value $\psi$ may be used directly in further processing, for example to control bias values in a motion vector selection process, or it may be subjected to a threshold to give a binary "periodic/non-periodic" decision. A suitable threshold value is 0.5.

The invention can be implemented in many ways. For example the processing may be carried out in real time on streaming data, or at an arbitrary rate on stored data. Different transforms may be used to convert the image data from the sampled pixel value domain to the spatial frequency domain.

The image may be down-sampled or up-sampled prior to evaluation of its spectral sparseness and the processing may be applied to a single block comprising the entire image or a part of the image.

In the above-described example luminance values for pixels were used. However other numerical parameters of pixels, such as colour-separation values, or colour difference values could be used.

The skilled person will appreciate that there are many motion compensated video processes that can benefit from control by one or more periodicity measures determined according to the invention. Examples include interpolation of new images within a sequence of images, data compression, and noise reduction.

Figure 5:
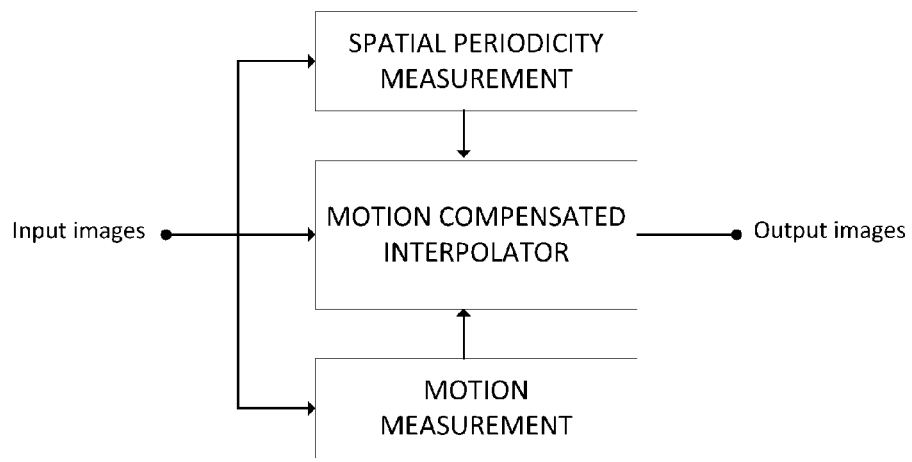
FIG. 5 is a block diagram of interpolation apparatus according to the invention.

Referring to FIG. 5, interpolation apparatus is shown in which input images are presented to a motion compensated interpolator and also to a spatial periodicity measurement block and to a motion measurement block.

The spatial periodicity measurement block serves to provide for each input image or for each block of an input image a spatial periodicity measure using any of the techniques described above. The motion measurement block may take any of a number of well-known forms. The spatial periodicity values are used by the interpolator to control the operation of the motion compensation process, so that—for example—more weight is given to the zero motion vector when processing blocks having high spatial periodicity measures. Thus these blocks are less likely to be shifted in a motion compensation process by, potentially unreliable, non-zero vectors.

The skilled man will understand that this invention has been described by way of example only and that a wide variety of modifications and alternative are possible within the scope of the appended claims and any equivalents thereof.

What is claimed:

1. A non-transitory computer-readable medium including instructions configured to cause a computer system to implement a method comprising the steps of:
   forming a spatial periodicity measure for at least part of an image; and
   controlling an image manipulation process in dependence on said spatial periodicity measure;
   wherein the step of forming a spatial periodicity measure comprises:
      measuring the sparseness of the two-dimensional spatial frequency spectrum of the image on a scale of zero to unity in which a two-dimensional spatial frequency spectrum having all equal values has a sparseness of zero and in which a two-dimensional spatial frequency spectrum having only one non-zero value has a sparseness of unity; and
      deriving a spatial periodicity measure data that is a function of said sparseness of the two-dimensional spatial frequency spectrum.

2. The non-transitory computer-readable medium of claim 1 in which at least one two-dimensional block of image data is processed in a two-dimensional spatial to frequency domain transform to form transformed image data.

3. The non-transitory computer-readable medium of claim 2 in which the said spatial periodicity measure is normalized by division by a function of the mean-square transformed image data for the said two-dimensional block.

4. The non-transitory computer-readable medium of claim 2 in which the said sparseness is a function of the mean-square value of the transformed image data for the said two-dimensional block and the mean value of the transformed image data for that two-dimensional block.

5. The non-transitory computer-readable medium of claim 4 in which the sparseness is a linear function of the mean-square value of the transformed image data and the square of the mean value of the transformed image data.

6. The non-transitory computer-readable medium of claim 4 in which the sparseness further depends on the mean-square value of one or more transform output values corresponding to low spatial frequencies.

7. The non-transitory computer-readable medium of claim 1 in which said sparseness is measured by counting the number of spatial frequency values in the two-dimensional spatial frequency spectrum that exceed a threshold value.

8. The non-transitory computer-readable medium of claim 7 in which said threshold comprises a representative value for the spatial frequency values in the two-dimensional spatial frequency spectrum.

9. The non-transitory computer-readable medium of claim 1 in which measuring the sparseness of the two-dimensional spatial frequency spectrum of the image utilizes a technique selected from the group of: allocating values of the spectrum to frequency bins and counting the number of bins that contain non-zero values; comparing values of the spectrum with a threshold and counting the number of values that exceed the threshold; comparing values of the spectrum with a representative value for the spectrum and counting the number of values that exceed the representative value; and forming a function of the mean-square value of the spectrum values and the mean value of the spectrum values.

10. The non-transitory computer-readable medium of claim 1 in which the said image manipulation process comprises the interpolation of at least one new image within a sequence of images.

11. The non-transitory computer-readable medium of claim 10, in which said interpolation comprises motion compensated interpolation and in which said motion compensation is controlled in dependence on said spatial periodicity measure.

12. A non-transitory computer-readable medium including instructions configured to cause a computer system to implement a motion compensated image manipulation process comprising the steps of:
forming a spatial periodicity measure for at least part of an image; and
controlling motion compensation of said motion compensated image manipulation process in dependence on said spatial periodicity measure;
wherein the step of forming a spatial periodicity measure comprises:
measuring the sparseness of the two-dimensional spatial frequency spectrum of the image utilizing a technique selected from the group of: allocating values of the spectrum to frequency bins and counting the number of bins that contain non-zero values; comparing values of the spectrum with a threshold and counting the number of values that exceed the threshold; comparing values of the spectrum with a representative value for the spectrum and counting the number of values that exceed the representative value; and forming a function of the mean-square value of the spectrum values and the mean value of the spectrum values; and
deriving a spatial periodicity measure data that is a function of said sparseness of the two-dimensional spatial frequency spectrum.

13. The non-transitory computer-readable medium of claim 12 in which at least one two-dimensional block of image data is processed in a two-dimensional spatial to frequency domain transform to form transformed image data.

14. The non-transitory computer-readable medium of claim 13 in which the said spatial periodicity measure is normalized by division by a function of the mean-square transformed image data for the said two-dimensional block.

15. The non-transitory computer-readable medium of claim 12 in which the said image manipulation process comprises the interpolation of at least one new image within a sequence of images.

16. The non-transitory computer-readable medium of claim 12 where said measure of the sparseness of the two-dimensional spatial frequency spectrum of the image has a scale of zero to unity in which a two-dimensional spatial frequency spectrum having all equal values has a sparseness of zero and in which a two-dimensional spatial frequency spectrum having only one non-zero value has a sparseness of unity.

17. A method of controlling a motion compensated image manipulation process in a processor, the method comprising the steps of:
forming a spatial periodicity measure for at least part of an image; and
controlling motion compensation of said image manipulation process in dependence on said spatial periodicity measure;
wherein the step of forming a spatial periodicity measure comprises:
measuring the sparseness of the two-dimensional spatial frequency spectrum of the image utilizing a technique selected from the group of: allocating values of the spectrum to frequency bins and counting the number of bins that contain non-zero values; comparing values of the spectrum with a threshold and counting the number of values that exceed the threshold; comparing values of the spectrum with a representative value for the spectrum and counting the number of values that exceed the representative value; and forming a function of the mean-square value of the spectrum values and the mean value of the spectrum values; and
deriving a spatial periodicity measure data that is a function of said sparseness of the two-dimensional spatial frequency spectrum.

18. The method of claim 17 in which at least one two-dimensional block of image data is processed in a two-dimensional spatial to frequency domain transform to form transformed image data.

19. The method of claim 17 in which the said image manipulation process comprises the interpolation of at least one new image within a sequence of images.

20. The method of claim 17 where said measure of the sparseness of the two-dimensional spatial frequency spectrum of the image has a scale of zero to unity in which a two-dimensional spatial frequency spectrum having all equal values has a sparseness of zero and in which a two-dimensional spatial frequency spectrum having only one non-zero value has a sparseness of unity.

* * * * *